United States Patent
Tan et al.

(10) Patent No.: US 11,275,823 B2
(45) Date of Patent: Mar. 15, 2022

(54) AUTHORITY CONFIGURATION METHOD AND DEVICE

(71) Applicant: Gree Electric Appliances, Inc. of Zhuhai, Guangdong (CN)

(72) Inventors: Zhikai Tan, Guangdong (CN); Ming Liu, Guangdong (CN); Yu Lai, Guangdong (CN); Jinyan Li, Guangdong (CN); Xiaoyu Xu, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 283 days.

(21) Appl. No.: 16/330,516

(22) PCT Filed: Apr. 7, 2017

(86) PCT No.: PCT/CN2017/079716
§ 371 (c)(1),
(2) Date: Mar. 5, 2019

(87) PCT Pub. No.: WO2018/049813
PCT Pub. Date: Mar. 22, 2018

(65) Prior Publication Data
US 2019/0205525 A1    Jul. 4, 2019

(30) Foreign Application Priority Data
Sep. 18, 2016 (CN) .......................... 201610831910.3

(51) Int. Cl.
*G06F 21/00* (2013.01)
*G06F 21/45* (2013.01)

(52) U.S. Cl.
CPC .................................. *G06F 21/45* (2013.01)

(58) Field of Classification Search
CPC .......... G06F 21/30; G06F 21/31; G06F 21/45; G06F 21/62; G06F 21/6218;
(Continued)

(56) References Cited

U.S. PATENT DOCUMENTS

| 7,024,556 | B1* | 4/2006 | Hadjinikitas | H04L 63/0815 709/225 |
| 8,793,509 | B1* | 7/2014 | Nelson | H04L 63/105 713/193 |
| 2015/0089622 | A1* | 3/2015 | Sondhi | H04L 63/20 726/9 |

FOREIGN PATENT DOCUMENTS

| CN | 1842785 A | 10/2006 |
| CN | 101178757 A | 5/2008 |

(Continued)

OTHER PUBLICATIONS

International Search Report, dated Jul. 12, 2017, in International application No. PCT/CN2017/079716, filed on Apr. 7, 2017.
(Continued)

*Primary Examiner* — Edward Zee
(74) *Attorney, Agent, or Firm* — McAndrews, Held & Malloy, Ltd.

(57) ABSTRACT

An authority configuration method and device are provided. The method includes: when a user logs in a system, a privacy information acquisition request is sent to the user; and an authority of the user is configured according to response information of the privacy information acquisition request. Prior to acquisition of privacy information of the user, the user chooses whether a system is permitted to collect the privacy information, and an authority of the user is configured according to the privacy information permitted by the user. A user is provided with a corresponding operation
(Continued)

authority while privacy of the user can be protected from being infringed, and the privacy of the user can be prevented from being leaked.

8 Claims, 2 Drawing Sheets

(58) Field of Classification Search
CPC . G06F 21/6245; G06F 21/6272; H04L 63/20; H04L 63/205
See application file for complete search history.

(56) References Cited

FOREIGN PATENT DOCUMENTS

| | | |
|---|---|---|
| CN | 101950341 A | 1/2011 |
| CN | 102761555 A | 10/2012 |
| CN | 102916933 A | 2/2013 |
| CN | 103051449 A | 4/2013 |
| CN | 104125203 A | 10/2014 |
| CN | 104394174 A | 3/2015 |
| CN | 104866774 A | 8/2015 |
| CN | 106411866 A | 2/2017 |
| CN | 106446666 A | 2/2017 |

OTHER PUBLICATIONS

Chinese search report dated Apr. 15, 2021 in Chinese application No. 2016108319103.

* cited by examiner

AUTHORITY CONFIGURATION METHOD AND DEVICE

This application is a 371 of International Patent Application No. PCT/CN2017/079716, filed Apr. 7, 2017, which claims benefit of Chinese Patent Application No. 201610831910.3, filed to the China Patent Office on Sep. 18, 2016, entitled "Authority Configuration Method and Device", contents of both of which are hereby incorporated by reference in their entirety.

TECHNICAL FIELD

The present disclosure relates to the technical field of communications, and in particular to an authority configuration method and device.

BACKGROUND

In the related art, an online electronic business hall (E-Care) may provide service functions such as call charge inquiry, bill inquiry, recharge payment, package change, account period change, etc. A correspondence between a role and a user authority may be preset in a system. Different roles correspond to different user authority sets. The authority of the user set refers to at least one authority to use at least one service function. A role is statically configured for each user. After a user logs in the system, a corresponding authority set is configured for the user according to the role configured for the user. When the user uses a certain service function, it is determined whether the user may use this service function according to the user authority set. However, with the rapid development of a network technology, the number of users of online electronic business halls such as E-Care is increasing, and methods in the related art cannot be applied to an electronic business hall system with a large number of users. At present, related information of a user may be obtained when the user logs in, and a user operation authority is dynamically set according to the related information, so as to achieve a purpose of setting the authority of the user without role configuration. However, the above method needs to collect the related information of the user through big data in the background, and the user cannot control which part of the related information may be collected. Since the related information is usually privacy information of the user, if the user cannot choose which privacy information can be collected, a privacy of the user may be infringed, and it is prone to leakage of user privacy information.

SUMMARY

At least some embodiments of the present disclosure provide an authority configuration method and device, so as at least to partially solve a technical problem in the related art that user authority configuration infringes user privacy information.

In one embodiment of the present disclosure, an authority configuration method is provided. The method includes the following steps.

When a user logs in a system, a privacy information acquisition request is sent to the user.

An authority of the user is configured according to response information of the privacy information acquisition request.

In another embodiment of the present disclosure, an authority configuration device is also provided. The device includes:

a request sending component, configured to send, when a user logs in a system, a privacy information acquisition request to the user; and an authority configuration component, configured to configure an authority of the user according to response information of the privacy information acquisition request.

According to the authority configuration method and device provided by the at least some embodiments of the present disclosure, prior to acquisition of privacy information of a user, the user chooses whether a system is permitted to collect the privacy information, and an authority of the user is configured according to the privacy information permitted by the user. A user is provided with a corresponding operation authority while privacy of the user can be protected from being infringed, and the privacy of the user can be prevented from being leaked.

BRIEF DESCRIPTION OF THE DRAWINGS

Other features, objects and advantages of the present disclosure will become more apparent by reading the detailed description made for non-restrictive embodiments with reference to the following drawings.

DETAILED DESCRIPTION

Figure 1:
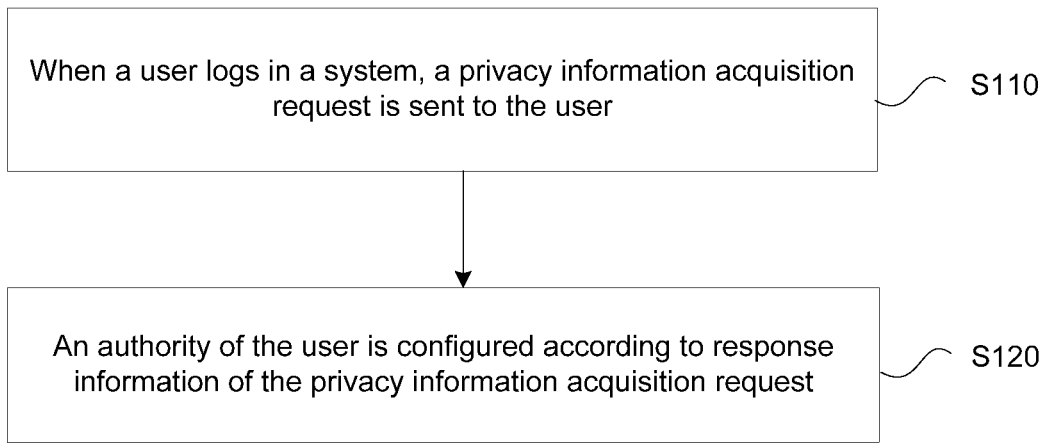
FIG. 1 is a flowchart of an authority configuration method according to a first embodiment of the present disclosure.

The present disclosure will be further described in detail below with reference to the accompanying drawings and embodiments. It can be understood that the specific embodiments described herein are merely illustrative of the present disclosure and are not intended to limit the present disclosure. In addition, it should be noted that, for the convenience of description, only some but not all of the contents related to the present disclosure are shown in the drawings.

Embodiment One

FIG. 1 is a flowchart of an authority configuration method according to a first embodiment of the present disclosure. The method in the present embodiment is applicable to a situation where an online business hall configures user authorities. It can be performed by an authority configuration device, which can be implemented by means of at least one of hardware and software, and can generally be applied to an operator server.

As shown in FIG. 1, the authority configuration method includes the steps as follows.

At step S110, when a user logs in a system, a privacy information acquisition request is sent to the user.

In an exemplary embodiment, in a user login system, the system sends a request to a user for acquiring the privacy information of the user. Therefore, the user may select appropriate privacy information to be provided for the system according to a degree of association between the privacy information and the system. The privacy information may include but not limited to at least one of the followings: user historical operation data and attributes of the user. The privacy information of the user is different for different systems. For example, if the system is an online business hall of a mobile operator and when the user logs in the online business hall, the privacy information may include: time of entry, attribution, and status of arrears. The system may send the privacy information acquisition request to the user through an information pushing mode of a short message or an application.

At step S120, an authority of the user is configured according to response information of the privacy information acquisition request.

When receiving the privacy information acquisition request, the user may send the privacy information or other information related to the privacy information to the system as a response. And the system may configure the authority of the user according to the response information of the privacy information acquisition request. The system may obtain at least one piece of privacy information of the user according to the response information. Since different users have different pieces of privacy information, an authority of a current user may be configured according to the privacy information. In an exemplary embodiment, the authority of the current user may be configured in the following manner. An expression of user privacy information and a user identity is preset, the expression includes a logical relationship between a privacy identity and the user identity, and the user identity is determined according to a calculation result of the expression. The user identity may be a plurality of user types preset in the system. For example, for a mobile communication operation system, the user identity may be classified into: a prepayment user, a broadband user, and a credit user. Specifically, a decision binary tree may be generated according to the expression, and a post-order traversal algorithm is used for obtaining the user identity. A corresponding authority may be obtained according to the correspondence between the user identity and the authority. The authority includes at least one service function operable by the user. In an exemplary embodiment, the at least one service function for prepayment users may include credit balances, recharge payment, etc. The at least one service function for credit users may include: line-of-credit query, line-of-credit upgrade, etc. Corresponding authorities are configured according to different user identities.

In the present embodiment, prior to acquisition of privacy information of a user, the user chooses whether a system is permitted to collect the privacy information, and an authority of the user is configured according to the privacy information permitted by the user. A user is provided with a corresponding operation authority while privacy of the user can be protected from being infringed, and the privacy of the user can be prevented from being leaked.

In an optional implementation of the present embodiment, the response information includes privacy information; and correspondingly, the operation that the authority of the user is configured according to the response information of the privacy information acquisition request includes the following steps. An authority of the user is configured according to the privacy information. The user may send privacy information as response information to the system. After receiving the response information, the system extracts the privacy information from the response information, and configures the authority of the user according to the privacy information. Therefore, the user can perform corresponding service operations through the authority. Since the privacy information is provided for the system by the user, that is the privacy information is obtained by the system with the permission of the user, the infringement of the user privacy is avoided.

In an optional implementation of the present embodiment, the method further includes that: within a preset time period after sending the privacy information acquisition request, when no response information is received, the authority of the user is configured according to a default setting. After receiving the privacy information acquisition request, the user considers the privacy information to be more important for personal reasons, and the user usually does not send the response information. In the present embodiment, for this case, the system confirms whether the response information is received within the preset time period after sending the privacy information acquisition request. When no response information is received, the authority of the user is configured according to the default setting. The preset time period may be set by experience, and may usually be set to 10 minutes, which can effectively avoid the delay of receiving response information due to the delay of a communication network. After it is determined that no response information is received, the authority of the user is configured according to the default setting. The default setting may be an authority setting corresponding to the user identity with the lowest authority. When there is no user privacy information, the user can still be provided with partial authorities, so that the user can complete basic service operations.

Embodiment Two

Figure 2:
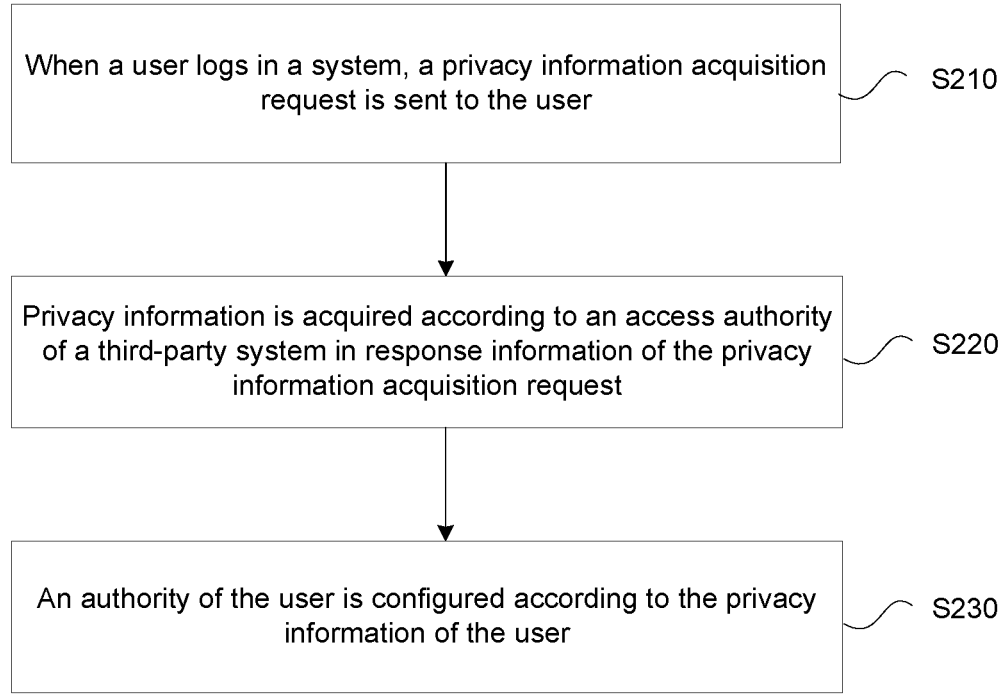
FIG. 2 is a flowchart of an authority configuration method according to a second embodiment of the present disclosure.

FIG. 2 is a flowchart of an authority configuration method according to a second embodiment of the present disclosure. This embodiment is optimized based on the above embodiment one. In the present embodiment, the response information is specifically optimized to: an access authority of a third-party system, and correspondingly, the operation that privacy information of the user is acquired according to the access authority of the third-party system includes the following steps. The authority of the user is configured according to the privacy information of the user.

Correspondingly, the authority configuration method provided by the present embodiment includes the steps as follows.

At step S210, when a user logs in a system, a privacy information acquisition request is sent to the user.

At step S220, privacy information is acquired according to an access authority of a third-party system in response information of the privacy information acquisition request.

At present, some of privacy data changes over time, it is difficult for users to grasp the change of the privacy data in real time, and these privacy data are not recorded on the user's client. For example, the system accessed by the user is a mobile communication recharge system, and the user does not know privacy information such as a current credit balance and the usage of a package. The mobile communication recharge system cannot acquire these pieces of privacy information according to the response information of the user. These pieces of privacy information are acquired through a third-party system, such as a system provided by a mobile communication operator. These privacy data are acquired from the third-party system with the permission of the user. In the present embodiment, the response information of the privacy information acquisition request may include the access authority of the third-party system, and the system may acquire privacy data from the third-party system by using the access authority of the third-party system. In an exemplary embodiment, the access authority may be an access token in a third-party system, and the system acquires the privacy information according to the access token through an open interface in the third-party system.

At step S230, the authority of the user is configured according to the privacy information of the user.

In the present embodiment, the response information is specifically optimized to an access authority of a third-party system, and correspondingly, the operation that privacy information is acquired according to the access authority of the third-party system includes the following steps. The authority of the user is configured according to the privacy information of the user. The privacy data can be acquired from the third-party platform according to the permission of the user, and the authority of the user can be configured according to the privacy data to avoid infringing the privacy of the user.

Embodiment Three

Figure 3:
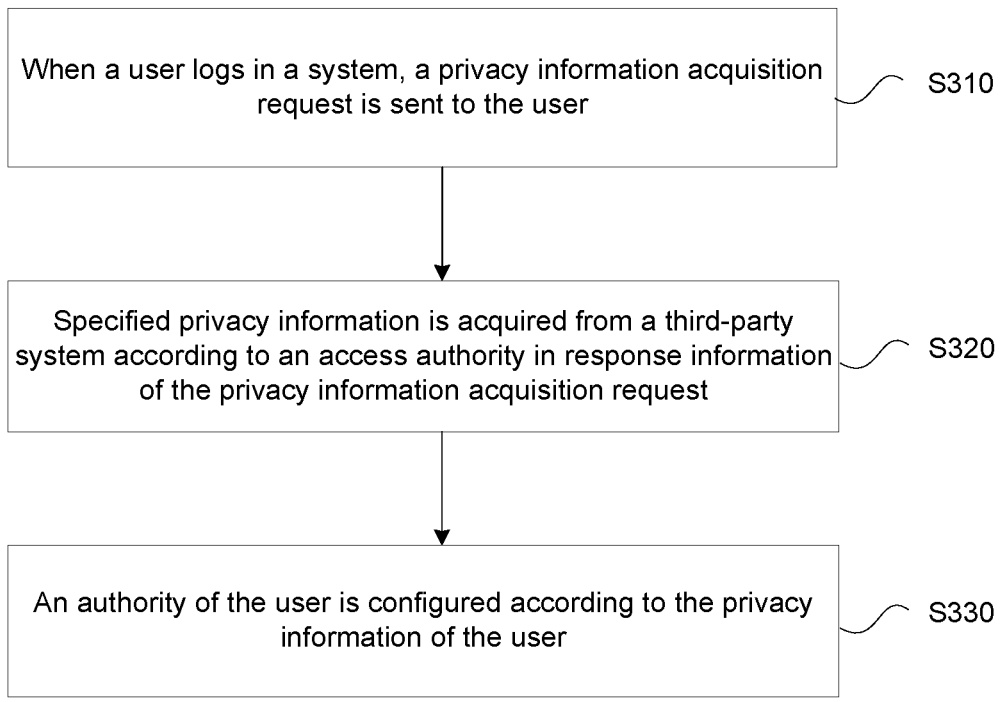
FIG. 3 is a flowchart of an authority configuration method according to a third embodiment of the present disclosure.

FIG. 3 is a flowchart of an authority configuration method according to a third embodiment of the present disclosure. The embodiment is optimized based on the above at least one of embodiment one and embodiment two. In the present embodiment, the response information is specifically optimized to: an access authority of a third-party system and specified privacy information, and correspondingly, the operation that privacy information of the user is acquired according to the access authority of the third-party system includes the following steps. Specified privacy information is acquired from the third-party system according to the access authority.

Correspondingly, the authority configuration method provided by the present embodiment includes the steps as follows.

At step S310, when a user logs in a system, a privacy information acquisition request is sent to the user.

At step S320, specified privacy information is acquired from a third-party system according to an access authority in response information of the privacy information acquisition request.

Since the third-party system stores a variety of user privacy data, some of the privacy data users do not want to be collected by a current system. In order to solve the above problem, in the present embodiment, the response information further includes: specified privacy information, and the user may select partial privacy information for system collection by an authority that needs to handle the service, so that the system sets an appropriate authority according to the partial privacy information. In an exemplary embodiment, the user may select privacy information suitable for system collection. For example, when a recharge authority is required, the user can select a mobile phone number as the privacy information for system collection from the third-party system without collecting, by the system, privacy information such as time limits of network entry and points from the third-party system. The system collects user-specified privacy information through the access authority of the third-party system. Alternatively, the user may also set a level of the privacy information, and send the level of the privacy information and the access authority of the third-party system as the response information to the system, and the system collects the level of the privacy information set by the user through the access authority of the third-party system to acquire the privacy information corresponding to the level.

At step S330, an authority of the user is configured according to the privacy information of the user.

In the present embodiment, the response information is specifically optimized to: an access authority of a third-party system and specified privacy information, and correspondingly, the operation that privacy information of the user is acquired according to the access authority of the third-party system includes the following steps. Specified privacy information is acquired from the third-party system according to the access authority. The system can be controlled to collect specified privacy information from the third-party system, so as to prevent leakage of user privacy information and infringement of user privacy information caused by the fact that the system collects too much privacy information.

Embodiment Four

Figure 4:
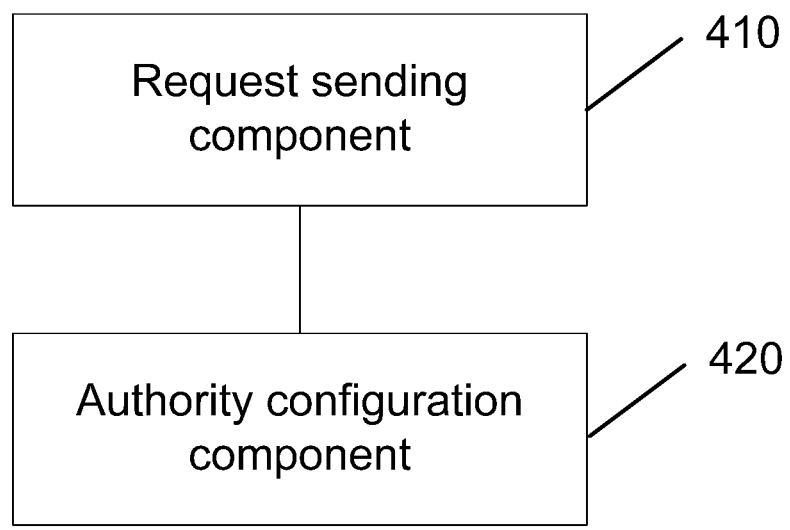
FIG. 4 is a structural schematic diagram of an authority configuration device according to a fourth embodiment of the present disclosure.

FIG. 4 is a schematic structure diagram of an authority configuration device according to a fourth embodiment of the present disclosure. As shown in FIG. 4, the device includes a request sending component 410 and an authority configuration component 420.

The request sending component 410 is configured to send, when a user logs in a system, a privacy information acquisition request to the user.

The authority configuration component 420 is configured to configure an authority of the user according to response information of the privacy information acquisition request.

According to the authority configuration device provided by the present embodiment, prior to acquisition of privacy information of a user, the user chooses whether a system is permitted to collect the privacy information, and an authority of the user is configured according to the privacy information permitted by the user. A user is provided with a corresponding operation authority while privacy of the user can be protected from being infringed, and the privacy of the user can be prevented from being leaked.

On the basis of each of the above embodiments, the response information includes: privacy information.

Correspondingly, the authority configuration component is configured to:

configure the authority of the user according to the privacy information.

On the basis of each of the above embodiments, the response information includes: an access authority of a third-party system.

Correspondingly, the authority configuration component includes an information acquisition element and an authority configuration element.

The information acquisition element is configured to acquire privacy information of the user according to the access authority of the third-party system.

The authority configuration element is configured to configure the authority of the user according to the privacy information of the user.

On the basis of each of the above embodiments, the response information further includes: specified privacy information.

The information acquisition element is further configured to:

acquire the specified privacy information from the third-party system according to the access authority.

On the basis of each of the above embodiments, the device further includes a default setting component.

The default setting component is configured to configure, within a preset time period after sending the privacy information acquisition request, the authority of the user according to a default setting when no response information is received.

The authority configuration device provided by the embodiment of the present disclosure can be used to execute the authority configuration method provided by any embodiment of the present disclosure, and has corresponding function components to achieve the same beneficial effects.

It will be apparent to those skilled in the art that the various components or steps of the present disclosure described above can be implemented by the equipment described above. Optionally, the embodiments of the present disclosure may be implemented by a program executable by a computer device, so that they may be stored in a storage device and executed by a processor, and the program may be stored in a computer readable storage medium. The above-mentioned storage medium may be a read only memory, a magnetic disk or an optical disk, etc.; or they may be separately fabricated into individual integrated circuit components, or a plurality of components or steps thereof may be fabricated as a single integrated circuit component. Thus, the present disclosure is not limited to the combination of any specific hardware and software.

It is noted that the above are the exemplary embodiments of the present disclosure and the technical principles applied thereto. Those skilled in the art will appreciate that the present disclosure is not limited to the specific embodiments described herein, and various obvious changes, re-adjustments and substitutions may be made by those skilled in the art without departing from the scope of protection of the present disclosure. Therefore, the present disclosure has been described in detail by the above embodiments, but the present disclosure is not limited to the above embodiments, and more other equivalent embodiments may be included without departing from the concept of the present disclosure. The scope of the present disclosure is determined by the scope of the appended claims.

What is claimed is:

1. An authority configuration method, comprising:
   when a user logs in a system, sending a privacy information acquisition request to the user; and
   configuring an authority of the user according to response information of the privacy information acquisition request, wherein the response information comprises: privacy information;
   wherein configuring the authority of the user according to the response information of the privacy information acquisition request comprises:
   determining a user identity corresponding to the response information according to a logical relationship between the privacy information and the user identity; and
   obtaining the authority of the user according to a correspondence between the user identity and the authority;
   further comprising: within a preset time period after sending the privacy information acquisition request, when no response information is received, configuring the authority of the user according to a default setting, wherein the default setting is configured to provide the user with partial authorities, so as to complete basic service operations.

2. The method as claimed in claim 1, wherein configuring the authority of the user according to the response information of the privacy information acquisition request comprises:
   configuring the authority of the user according to the privacy information.

3. The method as claimed in claim 1, wherein the response information comprises: an access authority of a third-party system;
   configuring the authority of the user according to the response information of the privacy information acquisition request comprises:
   acquiring the privacy information of the user according to the access authority of the third-party system; and
   configuring the authority of the user according to the privacy information of the user.

4. The method as claimed in claim 3, wherein the response information further comprises: specified privacy information, the specified privacy information being part of the privacy information;
   acquiring the privacy information of the user according to the access authority of the third-party system comprises:
   acquiring the specified privacy information from the third-party system according to the access authority.

5. An authority configuration device, comprising:
   a request sending component, configured to send, when a user logs in a system, a privacy information acquisition request to the user; and
   an authority configuration component, configured to configure an authority of the user according to response information of the privacy information acquisition request, wherein the response information comprises: privacy information;
   wherein the authority configuration component is further configured to determine a user identity corresponding to the response information according to a logical relationship between privacy information and the user identity; and obtain the authority of the user according to a correspondence between the user identity and the authority;
   further comprising: a default setting component, configured to configure, within a preset time period after sending the privacy information acquisition request, the authority of the user according to a default setting when no response information is received, wherein the default setting is configured to provide the user with partial authorities, so as to complete basic service operations.

6. The device as claimed in claim 5, wherein
   the authority configuration component is configured to configure the authority of the user according to the privacy information.

7. The device as claimed in claim 5, wherein the response information comprises: an access authority of a third-party system;
   the authority configuration component comprises:
   an information acquisition element, configured to acquire the privacy information of the user according to the access authority of the third-party system; and
   an authority configuration element, configured to configure the authority of the user according to the privacy information of the user.

8. The device as claimed in claim 7, wherein the response information comprises: specified privacy information, the specified privacy information being part of the privacy information;
   the information acquisition element is further configured to acquire the specified privacy information from the third-party system according to the access authority.

* * * * *